(12) United States Patent
Tomomasa

(10) Patent No.: US 9,632,237 B2
(45) Date of Patent: Apr. 25, 2017

(54) ILLUMINATION DEVICE, DISPLAY DEVICE, AND TV RECEIVER

(71) Applicant: Sharp Kabushiki Kaisha, Osaka (JP)

(72) Inventor: Masatoshi Tomomasa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/896,318

(22) PCT Filed: Feb. 25, 2014

(86) PCT No.: PCT/JP2014/054486
§ 371 (c)(1),
(2) Date: Dec. 4, 2015

(87) PCT Pub. No.: WO2014/196228
PCT Pub. Date: Dec. 11, 2014

(65) Prior Publication Data
US 2016/0131831 A1 May 12, 2016

(30) Foreign Application Priority Data

Jun. 7, 2013 (JP) ................................. 2013-120593

(51) Int. Cl.
*H04N 3/14* (2006.01)
*H04N 5/64* (2006.01)
(Continued)

(52) U.S. Cl.
CPC ......... *G02B 6/0091* (2013.01); *G02B 6/0031* (2013.01); *G02B 6/0088* (2013.01); *H04N 9/3141* (2013.01)

(58) Field of Classification Search
CPC ... G02B 6/0031; G02B 6/0088; G02B 6/0091
(Continued)

(56) References Cited

U.S. PATENT DOCUMENTS 8,159,629 B2 * 4/2012 Yamashita ........... G02B 6/0085
349/58
2007/0230217 A1 10/2007 Sakaki
(Continued)

FOREIGN PATENT DOCUMENTS

JP 2007-265882 A 10/2007
JP 2011-82176 A 4/2011
(Continued)

*Primary Examiner* — Paulos M Natnael
*Assistant Examiner* — Jean W Desir
(74) *Attorney, Agent, or Firm* — Chen Yoshimura LLP

(57) ABSTRACT

An illumination device, including: a light source; a light guide plate having a light-entering face into which light from the light source enters and a light-exiting surface; a reflective sheet covering at least a portion on a light-entering face side of a bottom surface of the light guide plate; a chassis on a side of the reflective sheet opposite to the light guide plate, including at least a plate-shaped portion along the bottom surface of the light guide plate and a cut-out in the plate-shaped portion on the light-entering face side; and an opposite-side member on a side of the chassis opposite to the light guide plate, including a protrusion protruding from a light guide plate-side of a top surface of the opposite-side member through the cut-out towards the light guide plate, a top of the protrusion supporting a portion of the reflective sheet on the light-entering face side.

11 Claims, 11 Drawing Sheets

(51) Int. Cl.
*F21V 8/00* (2006.01)
*H04N 9/31* (2006.01)

(58) Field of Classification Search
USPC ...... 348/790, 789, 794, 836; 349/58, 62, 65;
345/87, 102
See application file for complete search history.

(56) References Cited

U.S. PATENT DOCUMENTS

2011/0085107 A1    4/2011  Noh et al.
2011/0292317 A1   12/2011  Kim et al.

FOREIGN PATENT DOCUMENTS

JP    2011-249331 A    12/2011
JP    2013-45512 A     3/2013

* cited by examiner

ILLUMINATION DEVICE, DISPLAY DEVICE, AND TV RECEIVER

TECHNICAL FIELD

The present invention relates to an illumination device, a display device, and a television receiver.

BACKGROUND ART

Liquid crystal display devices for liquid crystal televisions or the like include a liquid crystal panel used as a display panel to display images and a backlight device that supplies illumination light to the display panel, for example. One example of such a backlight device is an edge-lit backlight device in which a light guide plate is housed in a case and guides light from a light source that enters a light-entering face provided along at least one end face of the light guide plate to the display surface side of the light guide plate.

In edge-lit backlight devices, a reflective sheet is sometimes arranged between the case and the light guide plate in order to reflect light that leaks from the surface of the light guide plate opposite to the light-exiting surface back into the light guide plate. In such backlight devices, if the reflective sheet separates from the light guide plate on the light-entering face side of the light guide plate, light may leak out of the resulting gap.

Patent Document 1 discloses an edge-lit backlight unit in which separation of the reflective sheet from the light guide plate on the light-entering face side of the light guide plate is prevented or inhibited. In this backlight unit, the reflective sheet is arranged between the light guide plate and a reflector that functions as a case, and protrusions that protrude towards the reflective sheet are formed in portions of the reflector near the light source. Moreover, the portion of the reflective sheet extending out past the light-entering face towards the light source is arranged on top of these protrusions, thereby curving the reflective sheet. This configuration prevents or inhibits separation of the reflective sheet from the light guide plate near the light-entering face of the light guide plate.

RELATED ART DOCUMENT

Patent Document

Patent Document 1: Japanese Patent Application Laid-Open Publication No. 2007-265882

Problems to be Solved by the Invention

However, for design reasons or the like, some edge-lit backlight devices have recesses formed in the light-entering face side of a chassis that functions as a case. Unlike in the configuration in Patent Document 1, protrusions or the like for supporting the light-entering face side of the reflective sheet cannot be formed in the light-entering face sides of the chassis, and the reflective sheet cannot be supported unless additional components are added.

SUMMARY OF THE INVENTION

The technology disclosed in the present specification was developed in view of such problems. The present specification aims to provide a technology that, in a configuration in which recesses are formed in the light-entering face side of the chassis, can prevent or inhibit leakage of light on the light-entering face sides of the light guide plate without adding additional components.

Means for Solving the Problems

The technology disclosed in the present specification relates to an illumination device, including: a light source; a light guide plate in which at least one end face is a light-entering face into which light from the light source enters and one surface is a light-exiting surface; a reflective sheet arranged covering at least a portion on a light-entering face side of a bottom surface of the light guide plate opposite to the light-exiting surface; a chassis that is arranged on a side of the reflective sheet opposite to the light guide plate and that includes at least a plate-shaped portion arranged along the bottom surface of the light guide plate, a cut-out being provided in the plate-shaped portion on the light-entering face side; and an opposite-side member that is arranged on a side of the chassis opposite to the light guide plate and that includes a protrusion protruding from a light guide plate-side of a top surface of the opposite-side member through the cut-out towards the light guide plate, a top of the protrusion supporting a portion of the reflective sheet on the light-entering face side.

In the illumination device described above, the top of the protrusion supports the light-entering face side of the reflective sheet, and therefore the portion of the reflective sheet covering the light-entering face side of the surface of the light guide plate opposite to the light-exiting surface is sandwiched between the protrusion and the light guide plate. This configuration makes it possible to prevent or inhibit separation of the light-entering face side of the reflective sheet from the light guide plate and also makes it possible to prevent or inhibit leakage of light due to separation of that portion from the light guide plate. Furthermore, the protrusion is formed as an integrated part of the member arranged on the side of the chassis opposite to the light guide plate side, thereby making it possible to support the light-entering face side of the reflective sheet without adding additional components. In this way, the illumination device described above makes it possible to, in a configuration in which a recess is formed in the light-entering face side of the chassis, prevent or inhibit leakage of light on the light-entering face side without adding additional components.

The illumination device may further include: a light source substrate on which the light source is mounted in a plurality and that is arranged adjacent to the cut-out in the plate-shaped portion of the chassis; a light source driving substrate that supplies power to the light source substrate; and a connecting member that electrically connects the light source substrate to the light source driving substrate, wherein the connecting member is drawn through the cut-out to connect to the light source substrate.

In a large illumination device, the recess must be formed in the light-entering face side of the chassis near the light source substrate in order to make it easier to draw through the connecting members that electrically connect the light source driving substrate to the light source substrate. This configuration makes it possible to, in the illumination device in which the connecting member that electrically connects the light source driving substrate to the light source substrate is drawn through the recess formed in the chassis, prevent or inhibit leakage of light from the light-entering face side without adding additional components.

The top of the protrusion may be flat and disposed along the bottom surface of the light guide plate.

In this configuration, the light-entering face-side edge of the reflective sheet is supported by the flat top of the protrusion, thereby making it possible to increase the surface area of the section of the top of the protrusion that supports the reflective sheet in comparison with a configuration in which the top of the protrusion is pointed, for example. This, in turn, makes it possible to effectively support the reflective sheet using the protrusion.

The protrusion may be a column formed along an edge of the reflective sheet on the light-entering face side.

In this configuration, the majority of the light-entering face side of the reflective sheet is supported by the protrusion, thereby making it possible to satisfactorily support the reflective sheet using the protrusion.

The protrusion may be provided in a plurality along a direction orthogonal to the light-entering face of the light guide plate.

In this configuration, the reflective sheet is supported by the protrusions along the direction orthogonal to the light-entering face, thereby making it possible to satisfactorily support the reflective sheet using the protrusions.

The illumination device may further include a cushioning member between the top of the protrusion and the reflective sheet.

In this configuration, including the cushioning member makes it possible to reduce transmission of heat from the protrusion to the reflective sheet. Furthermore, the cushioning member makes it possible to prevent or inhibit the occurrence of squeaking noises or the like between the protrusion and the reflective sheet.

The illumination device may further include an exterior member that forms an exterior of the illumination device and that is arranged on a side of the opposite-side member opposite to the chassis.

In this configuration, the opposite-side member is covered by the exterior member and is therefore protected from external impacts or the like, thereby making it possible to make the protrusion less likely to be damaged.

The opposite-side member may form an exterior of the illumination device.

This makes it possible to, in a configuration in which the member that forms the exterior of the illumination device includes a protrusion that supports the light-entering face side of the reflective sheet, prevent or inhibit leakage of light on the light-entering face side without adding additional components.

The technology disclosed in the present specification may be used to provide a display device that includes the above-mentioned illumination device and a display panel for displaying images using light from the illumination device. Moreover, a display device in which the display panel is a liquid crystal panel that uses a liquid crystal material exhibits both an inventive step and technical utility. Furthermore, a television receiver device provided with the abovementioned display device also exhibits an inventive step and technical utility.

Effects of the Invention

The technology disclosed in the present specification makes it possible to, in a configuration in which recesses are formed in the light-entering face side of a chassis, prevent or inhibit leakage of light on the light-entering face sides of a light guide plate without adding additional components.

DETAILED DESCRIPTION OF EMBODIMENTS

Embodiment 1

Embodiment 1 will be described below with reference to figures. The present embodiment is an example of a television receiver TV. X, Y, and Z axes are illustrated for each figure and are common to each figure (that is, the X, Y, and Z axes point in the same directions in each figure). Here, the Y direction is the vertical direction, and the X direction is the horizontal direction. Moreover, "up" and "down" refer to the vertical direction unless specifically noted otherwise, and in cross-sectional views, the upper sides of components will be referred to as the "front sides", and the lower sides will be referred to as the "rear sides".

Figure 1:
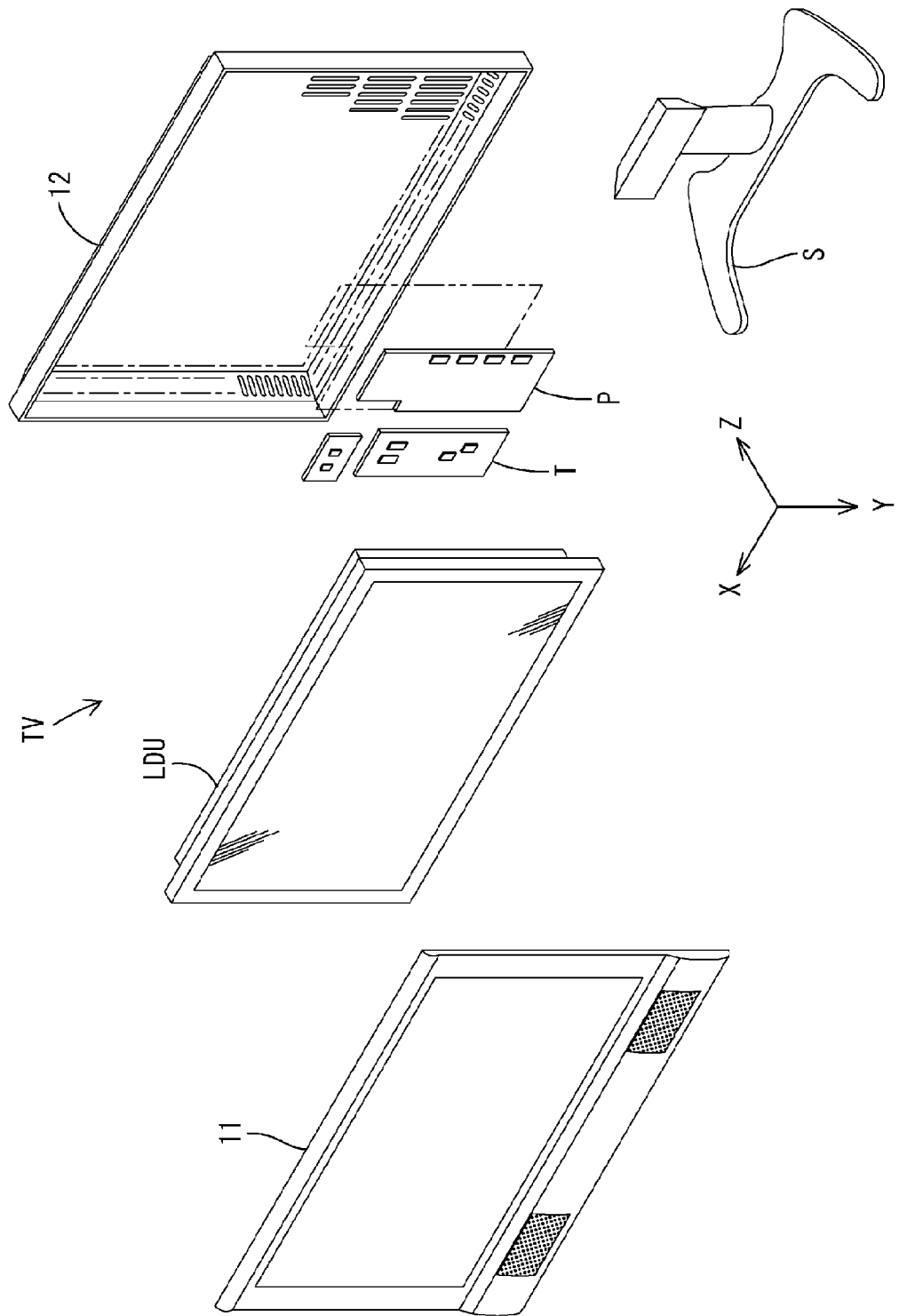
FIG. 1 is an exploded perspective view of a television receiver according to Embodiment 1.
Figure 2:
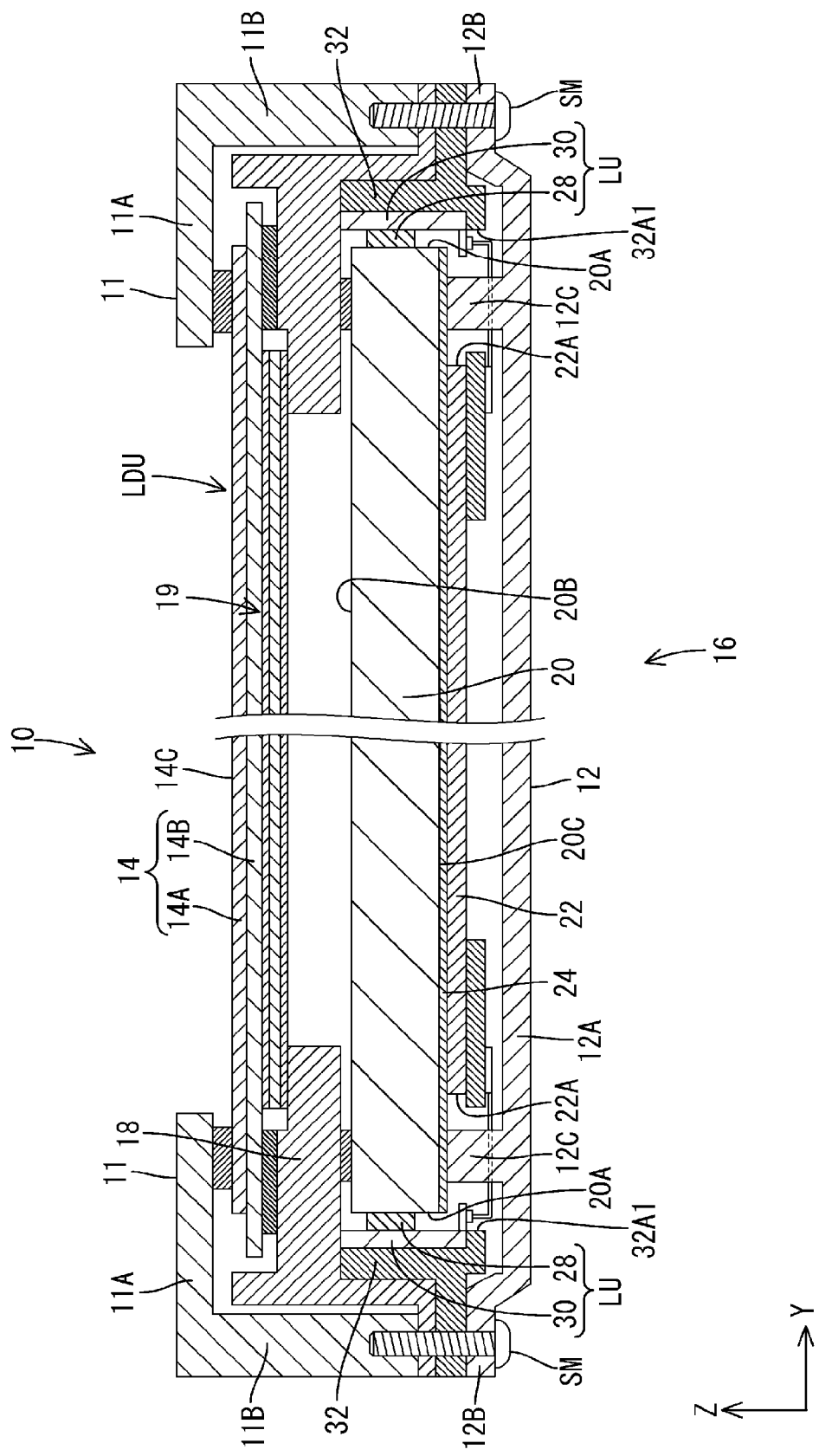
FIG. 2 is a cross-sectional view taken along one of the short sides of a liquid crystal display device.

As illustrated in FIGS. 1 and 2, the television receiver TV of the present embodiment includes a large liquid crystal display device 10 (an example of a display device), a power supply P, a tuner T, and a stand S. The liquid crystal display device 10 includes a large liquid crystal panel 14 and a large backlight device 16 (an example of an illumination device) that supplies light to the liquid crystal panel 14. The components of the backlight device 16 are housed within a pair of cabinets 11 and 12, which are exterior members that form the exterior of the backlight device 16. Here, as illustrated in FIG. 1, the components of the backlight device 16 other than the cabinets 11 and 12 form a liquid crystal display unit LDU.

As illustrated in FIG. 2, the liquid crystal panel 14 has a horizontally elongated rectangular shape when viewed in a plan view. The liquid crystal panel 14 includes a pair of glass substrates 14A and 14B that have excellent transparency and are fixed to one another with a prescribed gap maintained therebetween as well as a liquid crystal material sealed between the substrates 14A and 14B. The front side substrate is the color filter (CF) substrate 14A, and the rear side substrate is the array substrate 14B. The array substrate 14B includes a plurality of source lines and gate lines that are mutually orthogonal to one another, a plurality of switching elements (TFTs, for example) that are connected to the source lines and the gate lines, a plurality of pixel electrodes connected to the switching elements, an alignment film, and the like. Meanwhile, the color filter substrate 14A includes:

a color filter that includes a plurality of colored portions that have colors such as red (R), green (G), and blue (B) and are arranged in a prescribed pattern; an opposite electrode; an alignment film; and the like. Moreover, polarizing plates (not illustrated in the figures) are provided on the outward-facing surfaces of the substrates 14A and 14B.

As illustrated in FIG. 2, the array substrate 14B of the liquid crystal panel 14 is larger than the color filter substrate 14A when viewed in a plan view, and the edges of the array substrate 14B extend outwards past the edges of the color filter substrate 14A. More specifically, the peripheral edges of the array substrate 14B extend outwards past the peripheral edges of the color filter substrate 14A around the entire periphery thereof. Along one of the long-side edges of the array substrate 14B, a plurality of terminals are drawn out from the gate lines and source lines. These terminals are connected to a driver for driving the liquid crystal layer. The driver is mounted on a flexible substrate (not illustrated in the figure). Signals from a control board (not illustrated in the figure) are sent to each terminal via the flexible substrate in order to display images on a display surface 14C of the liquid crystal panel 14. The display surface 14C of the liquid crystal panel 14 includes a display region in which images can be displayed that is positioned in the center area of the display surface 14C and a frame-shaped non-display region that is positioned in the peripheral area of the display surface 14C and surrounds the display region. Furthermore, as illustrated in FIG. 2, the liquid crystal panel 11 is placed on top of the front side (light-exiting side) of an optical member 19, and the rear surface of the liquid crystal panel 11 (that is, the outward-facing surface of the rear polarizing plate) is fixed to the optical member 19 with no substantial gap therebetween. This prevents dust or the like from penetrating between the liquid crystal panel 14 and the optical member 19.

Next, each component of the backlight device 16 will be described. The backlight device 16 includes the pair of cabinets 11 and 12, the optical member 19, a frame 18, a chassis 22, a light guide plate 20, LED units LU, a reflective sheet 24, and heat sinks 32. Of the pair of cabinets 11 and 12 of the backlight device 16, the cabinet disposed on the front side of the backlight device 16 is the front cabinet 11. The front cabinet 11 includes a frame-shaped panel guard 11A made using a plate that runs parallel to the display surface 14C of the liquid crystal panel 14 and a hollow cylindrical-shaped sidewall 11B made from plates that extend from the outer edges of the panel guard 11A in the front to rear direction (the Z direction). The front cabinet 11 has a substantially L-shaped cross section. The panel guard 11A has a horizontally elongated frame shape that follows the peripheral edges of the liquid crystal panel 14 (the non-display region/bezel region) and covers substantially the entire outer periphery of the liquid crystal panel 14 from the front side. Moreover, a cushioning member 13A is provided between the panel guard 11A and the liquid crystal panel 14. The cylindrical-shaped sidewall 11B surrounds the backlight device 16 around the entire periphery thereof.

Of the pair of cabinets 11 and 12 of the backlight device 16, the cabinet disposed on the rear side of the backlight device 16 is the rear cabinet 12 (an example of an opposite-side member). The rear cabinet 12 is arranged on the rear side of the chassis 22 (that is, on the side opposite to the light guide plate 20 side). The front cabinet 11 and the rear cabinet 12 form the exterior of the backlight device 16. The rear cabinet 12 is a shallow, substantially box-shaped member and includes a plate-shaped bottom floor 12A that runs parallel to the display surface of the liquid crystal panel 14 and an edge 12B that extends slightly outwards and up from the edges of the bottom floor 12A towards the front side. The hollow cylindrical portion 11B of the front cabinet 11 and the edge 12B of the rear cabinet 12 sandwich together the frame 18 and the outer edges of the heat sinks 32 and are fixed together using screws SM. Furthermore, ribs 12C (an example of protrusions) are formed in the bottom floor 12A of the rear cabinet 12 and protrude towards the front side. The configuration and arrangement of the ribs 12C will be described in more detail later.

The optical member 19 has a horizontally elongated shape similar to the liquid crystal panel 14 when viewed in a plan view but is smaller than the liquid crystal panel 14 in both the X and Y directions (that is, both along the short sides and the long sides) when viewed in a plan view. The optical member 19 is arranged on the front side of the light guide plate 20 (that is, on the light-exiting surface 20B side) and between the liquid crystal panel 14 and the light guide plate 20. The optical member 19 includes three sheet-shaped layers that are layered together. Specific examples of sheets for the optical member 19 include diffusion sheets, lens sheets, and reflective polarizing sheets, for example. The sheets to use can be selected from among these examples as appropriate.

Figure 5:
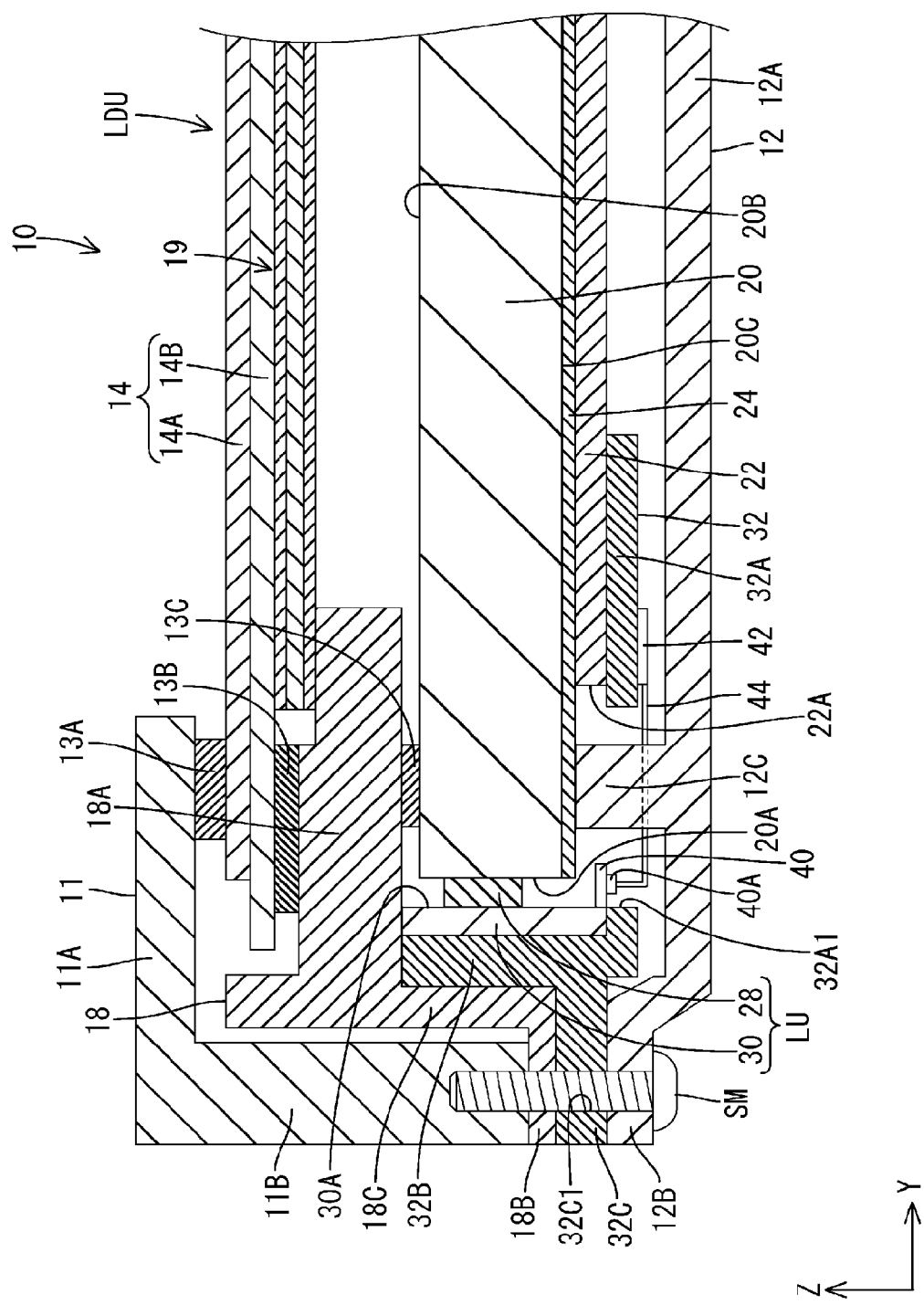
FIG. 5 is an enlarged cross-sectional view taken near a protrusion in FIG. 2.

As illustrated in FIG. 2, like the front cabinet 11, the frame 18 has a horizontally elongated frame shape overall. The frame 18 is made from a synthetic resin and treated such that the surfaces thereof are black, for example, and exhibit a light-shielding property. As illustrated in FIG. 5, the frame 18 includes a frame-shaped inner frame section 18A arranged between the light guide plate 20 and the liquid crystal panel 14 and the optical member 19, a frame-shaped outer frame section 18B arranged between the front cabinet 11 and the heat sinks 32, and a connecting portion 18C that connects together the inner frame section 18A and the outer frame section 18B. The inner frame section 18A covers substantially the entire periphery of the light guide plate 20 from the front side and supports substantially the entire peripheries of the liquid crystal panel 14 and the optical member 19 from the rear side. In the inner frame section 18A, an outer section that supports the periphery of the liquid crystal panel 14 is stepped up towards the front side relative to an inner section that supports the optical member 19. Furthermore, cushioning members 13B and 13C are provided between the inner frame section 18A and the liquid crystal panel 14 and between the inner frame section 18A and the light guide plate 20, respectively. The outer frame section 18B is arranged further towards the rear side than is the inner frame section 18A and is sandwiched between the cylindrical-shaped sidewall 11B of the front cabinet 11 and the edges of the heat sinks 32 and fixed in place with screws. The connecting portion 18C connects the inner edges of the outer frame section 18B to the outer edges of the inner frame section 18A (which is arranged further towards the front side than is the outer frame section 18B) and extends from those inner edges to outer edges in the thickness direction of the backlight device 16 (that is, in the Z direction).

The light guide plate 20 is made from a synthetic resin material (such as an acrylic resin such as polymethyl methacrylate (PMMA) or a polycarbonate, for example) that has a refractive index sufficiently higher than that of air and is also substantially transparent (exhibits excellent transparency). Similar to the liquid crystal panel 14 and the chassis 22, the light guide plate 20 has a horizontally elongated rectangular shape when viewed in a plan view. The light guide plate 20 is plate-shaped and has a thickness greater than the thickness of the optical member 19. The long sides of the surface of the light guide plate 20 are parallel to the X direction, and the short sides of the surface of the light guide plate 20 are parallel to the Y direction. The thickness direction of the light guide plate 20 is orthogonal to the surface of the light guide plate 20 and parallel to the Z direction. The light guide plate 20 is arranged on the rear side of the optical member 19 with a prescribed gap left therebetween and faces the optical member 19. Moreover, both long-side end faces of the light guide plate 20 (that is, the pair of end faces opposite to one another along the long sides) are light-entering faces 20A. The light-entering faces 20A face LEDs 28 included in the LED units LU, and light emitted from the LEDs 28 enters the light-entering faces 20A.

As illustrated in FIG. 2, the light guide plate 20 is arranged with the light-exiting surface 20B (the primary surface, the front surface) facing the optical member 19 and the opposite surface 20C (that is, the (rear) surface that is opposite to the light-exiting surface 20B) facing the reflective sheet 24. The light guide plate 20 is supported by the chassis 22 with the reflective sheet 24 sandwiched therebetween. In other words, the light guide plate 20 is arranged between the LED units LU in the Y direction and between the optical member 19 and the reflective sheet 24 in the Z direction. The light emitted from the LED units LU in the Y direction enters the light-entering faces 20A. The light guide plate 20 spreads that light throughout the interior thereof, and the light then exits from the light-exiting surface 20B towards the optical member 19. Moreover, at least one of the light-exiting surface 20B and the opposite surface 20C of the light guide plate 20 is patterned to include a prescribed in-plane distribution of reflective portions (not illustrated in the figure) that reflect the internal light or scattering portions (not illustrated in the figure) that scatter the internal light. This ensures that the light emitted from the light-exiting surface 20B of the light guide plate 20 has a uniform in-plane distribution.

The reflective sheet 24 has an elongated rectangular shape and is made from a synthetic resin, and the surface of the reflective sheet 24 has a white color that exhibits excellent reflectivity. The long sides of the reflective sheet 24 are parallel to the X direction, and the short sides of the reflective sheet 24 are parallel to the Y direction. The front surface of the reflective sheet 24 is the reflective surface and contacts and covers the entire opposite surface 20C of the light guide plate 20. Furthermore, the reflective sheet 24 reflects light that escapes from the LED units LU or the opposite surface 20C of the light guide plate 20. As illustrated in FIG. 5, the light-entering face 20A-side edges of the reflective sheet 24 are aligned with those light-entering faces 20A in the short side direction of the light guide plate 20 (that is, in the Y direction). The light-entering face 20A sides of the reflective sheet 24 are supported by the ribs 12C of the rear cabinet 12.

Figure 4:
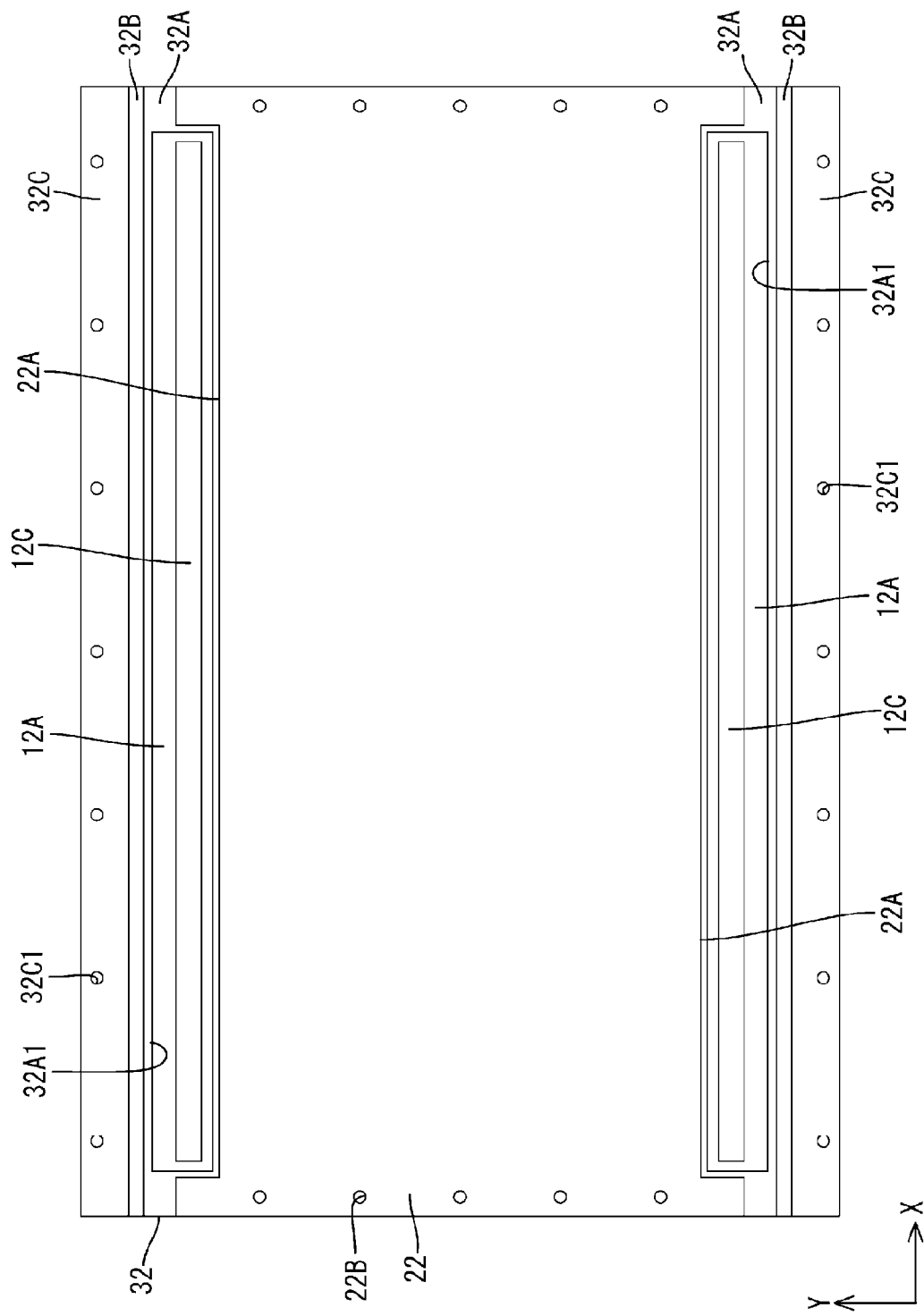
FIG. 4 is a front plan view of the chassis and the heat sinks.

The chassis 22 is made from a metal plate such as an aluminum plate or an electrogalvanized steel (SECC) plate. As illustrated in FIGS. 2 and 4, the chassis 22 has a horizontally elongated and substantially rectangular shape similar to the liquid crystal panel 14. The long sides of the chassis 22 are parallel to the X direction (the horizontal direction), and the short sides of the chassis 22 are parallel to the Y direction (the vertical direction). The chassis 22 is arranged parallel to the surfaces of the light guide plate 20. The chassis 22 supports the light guide plate 20 from the rear side, and the chassis 22 and the light guide plate 20 sandwich substantially the entire reflective sheet 24 therebetween. As illustrated in FIG. 4, recesses 22A are formed in both long-side edges of the chassis 22 (that is, in the edges on the light-entering face 20A sides of the light guide plate 20). As illustrated in the plan view in FIG. 4, these recesses 22A are formed opening in the short side direction of the chassis 22 and run along substantially the entire long side edges thereof. Moreover, chassis screw holes 22B are formed along both short side edges of the chassis 22, and the chassis 22 is fixed to the frame 18 using screws inserted through these chassis screw holes 22B. Sandwiching the reflective sheet 24 between the light guide plate 20 and the chassis 22 in this way prevents or inhibits warping of the reflective sheet 24 due to transmission of heat thereto.

Figure 3:
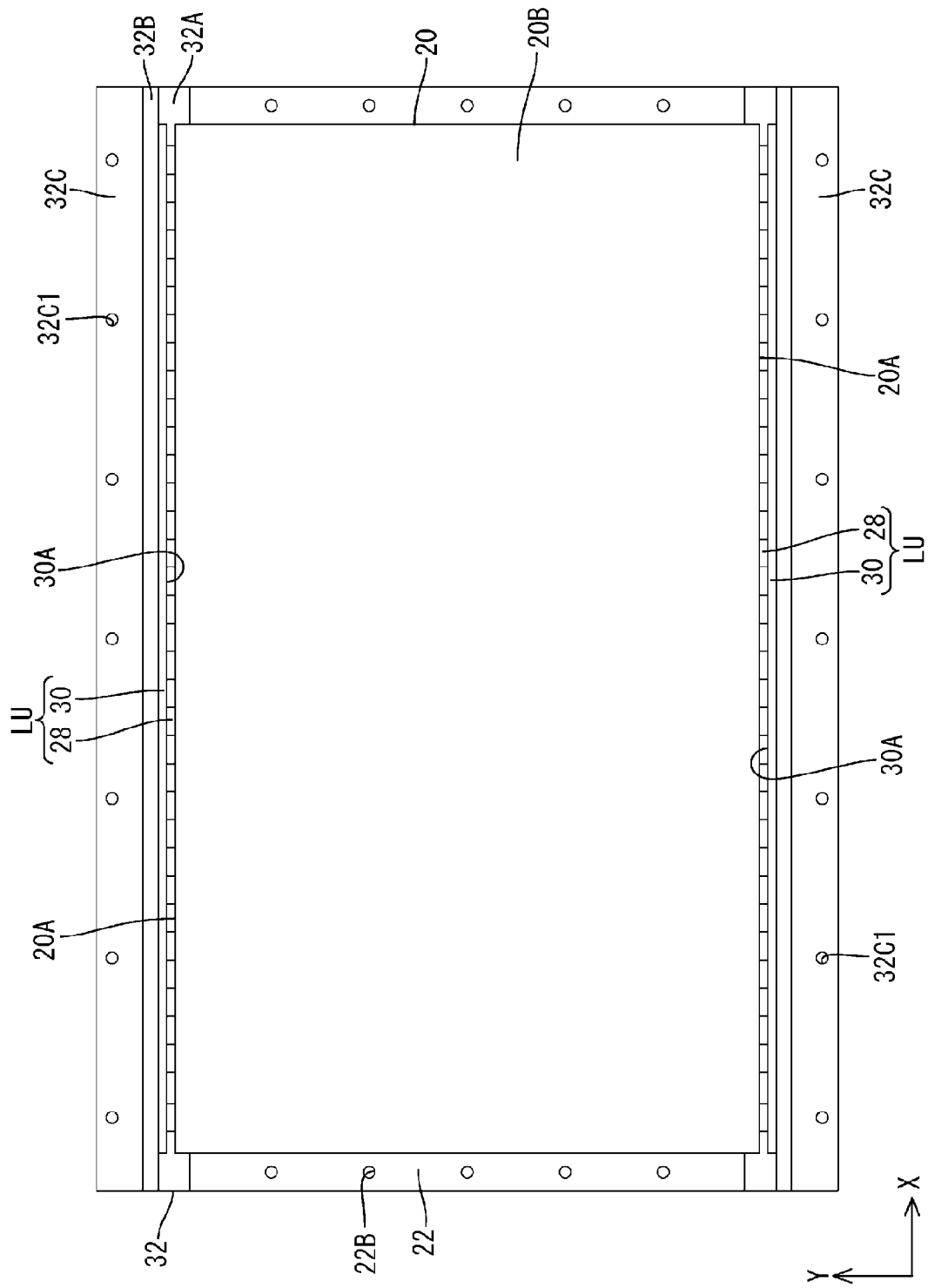
FIG. 3 is a front plan view of a chassis and heat sinks assembled together with a light guide plate and LED units.

The LED units LU are arranged along the long sides of the chassis 22, and each LED unit LU includes an LED substrate 30 and LEDs 28. As illustrated in FIGS. 2 and 3, the LED substrates 30 of the LED units LU have a long, thin plate shape and extend along the long sides of the light guide plate 20 (that is, in the X direction/in the lengthwise direction of the light-entering faces 20A). The LED substrates 30 are arranged with the primary surfaces thereof parallel to the light-entering faces 20A of the light guide plate 20. The length of the LED substrates 30 in the X direction is approximately equal to the length of the long sides of the light guide plate 20. The inner surfaces of the LED substrates 30 (that is, the surfaces that face the light guide plate 20) are mounting surfaces 30A on which the plurality of LEDs 28 are surface-mounted.

As illustrated in FIG. 5, the rear side edges of the LED substrates 30 extend past the opposite surface 20C of the light guide plate 20 in the rear side direction and are arranged close to and facing the recesses 22A formed in the chassis 22. A wiring pattern (not illustrated in the figure) that is made from a metal film (such as copper foil) and runs in the X direction is formed on the mounting surface 30A of each LED substrate 30 to connect the respective LEDs 28 in series. As illustrated in FIG. 5, on the rear side edge of the mounting surface 30A of each LED substrate 30, LED connectors 40 (an example of connecting members) are connected to both ends of the wiring pattern. Power is supplied to the LED substrates 30 via these LED connectors 40. The supply of power to the LED substrates 30 will be described in more detail later.

Each LED 28 of the LED units LU includes an LED element (not illustrated in the figures) that is sealed to the respective LED substrate 30 using a resin material. The LED elements mounted on the LED substrates 30 emit light of primarily one wavelength. More specifically, the LED elements emit a single color of blue light. Meanwhile, a phosphor that is excited by the blue light emitted from the LED elements and emits light of a prescribed color is dispersed in the resin packages used to seal the LED elements. Overall, the LED element-resin package assemblies emit primarily white light. It should be noted that an appropriate combination of a yellow phosphor that emits yellow light, a green phosphor that emits green light, and a red phosphor that emits red light or any single one of these phosphors can be used for the phosphor. These LEDs 28 are so-called top-emitting LEDs in which the primary light-emitting surface of each LED 28 is the surface opposite to the mounting surface 30A of the respective LED substrate 30. The primary light-emitting surfaces of the LEDs 28 are arranged facing the respective light-entering faces 20A of the light guide plate 20 with substantially no gap therebetween.

Each heat sink 32 is made from a metal that exhibits excellent thermal conductivity, such as aluminum. As illustrated in FIG. 5, each heat sink 32 includes a heat-dissipating portion 32A that contacts the chassis 22, a mounting portion 32B to which the respective LED substrate 30 is attached, and a protruding portion 32C that protrudes outwards from the area between the heat-dissipating portion 32A and the mounting portion 32B. Together, the heat-dissipating portion 32A and the mounting portion 32B have a substantially L-shaped bent shape when viewed in a cross-sectional view. The length of the long sides of the heat sinks 32 is approximately equal to the length of the long sides of the LED substrates 30 and the light guide plate 20. As illustrated in FIG. 5, the heat-dissipating portion 32A of each heat sink 32 is arranged parallel to the chassis 22, with the long sides parallel to the X direction, the short sides parallel to the Y direction, and the thickness direction parallel to the Z direction. Each heat-dissipating portion 32A extends inwards in the Y direction from the rear side edge of the respective mounting portion 32B (that is, towards the center of the light guide plate 20), with the majority of each heat-dissipating portion 32A contacting the rear side of the chassis 22. A prescribed gap is maintained between the heat-dissipating portions 32A and the bottom floor 12A of the rear cabinet 12. In this way, heat transmitted from the LEDs 28 to the heat sinks 32 is effectively radiated from the heat-dissipating portions 32A to this gap. Furthermore, as illustrated in FIG. 4, an opening 32A1 is formed in the section of each heat-dissipating portion 32A that overlaps with the respective rib 12C of the rear cabinet 12 when viewed in a plan view. Each opening 32A1 extends in the lengthwise direction of the heat sinks 32 (that is, in the X direction) and is larger in both the X and Y directions than the periphery of the respective rib 12C.

As illustrated in FIG. 5, the mounting portions 32B of the heat sinks 32 extend upright from the outer edges (that is, the edges on the side opposite to the light guide plate 20 side) of the respective heat-dissipating portions 32A and are substantially perpendicular thereto. Each mounting portion 32B is plate-shaped and arranged parallel to the surfaces of the LED substrates 30 and the light-entering faces 20A of the light guide plate 20, with the long sides of each mounting portion 32B parallel to the X direction, the short sides parallel to the Z direction, and the thickness direction parallel to the Y direction. The LED substrates 30 are fixed to the inner surfaces of the mounting portions 32B (that is, to the surfaces that face the light guide plate 20) using screws or the like (not illustrated in the figure). The length of the long sides of the mounting portions 32B is approximately equal to the length of the long sides of the LED substrates 30 and the light guide plate 20. As illustrated in FIGS. 3 and 4, a plurality of heat sink screw holes 32C1 are formed in the protruding portions 32C of the heat sinks 32. The protruding portions 32C are sandwiched between the outer frame section 18B of the frame 18 and the edge 12B of the rear cabinet 12 and fixed to these components using screws SM inserted through the heat sink screw holes 32C1. In this way, the heat sinks 32 are fixed to the front cabinet 11 and the rear cabinet 12.

Next, the configuration and arrangement of the ribs 12C formed in the bottom floor 12A of the rear cabinet 12 will be described in detail with reference to FIGS. 4 and 5. The ribs 12C are integrated parts of the bottom floor 12A of the rear cabinet 12 and are formed in the light-entering face 20A-side sections of the bottom floor 12A (that is, at positions that overlap with the recesses 22A formed in the chassis 22 when viewed in a plan view). The ribs 12C are rectangular cylindrical-shaped and protrude from the surface of the bottom floor 12A (that is, the surface facing the light guide plate 20) towards the light guide plate 20. Moreover, the ribs 12C extend along the light-entering face 20A-side edges of the reflective sheet 24 (that is, along the long sides of the reflective sheet 24), with the long sides of the ribs 12C parallel to the X direction and the short sides parallel to the Y direction.

The ribs 12C go through the openings 32A1 formed in the heat sinks 32 and the recesses 22A formed in the chassis 22, with the top of the ribs 12C contacting the light-entering face 20A side of the reflective sheet 24. The top of the ribs 12C are flat, and these flat faces contact the light-entering face 20A side of the reflective sheet 24. By contacting the light-entering face 20A side of the reflective sheet 24, the top of the ribs 12C support the light-entering face 20A side of the reflective sheet 24 from the rear side. This configuration prevents or inhibits the light-entering face 20A side of the reflective sheet 24 from warping towards the rear side and separating from the light guide plate 20.

Next, the supply of power to the LED substrates 30 will be described. As illustrated in FIG. 5, the LED connectors 40 are arranged parallel to the surface of the chassis 22 and substantially perpendicular to the mounting surfaces 30A of the LED substrates 30, to which the LED connectors 40 are connected. Terminals 40A are formed on the LED connectors 40 in order to connect connecting wires 44 (an example of connecting members) thereto. Meanwhile, in the portions of the heat-dissipating portions 32A of the heat sinks 32 that sandwich the openings 32A1 and are opposite to the mounting portion 32B side, LED driving substrates 42 are fixed to the rear surfaces of the heat-dissipating portions 32A near the openings 32A1. Furthermore, one end of each of the connecting wires 44 is connected to the LED driving substrate 42, and the other ends of the connecting wires 44 are connected to the terminals 40A of the LED connectors 40. In this way, the LED driving substrates 42 are electrically connected to the LED substrates 30, and power is supplied from the LED driving substrates 42 to the LEDs 28 via the connecting wires 44 and the wiring patterns on the LED substrates 30.

Next, a procedure for fixing the LED connectors to the LED substrates in the backlight device 16 according to the present embodiment will be described. Because the backlight device 16 of the present embodiment is large, even if openings for connecting members such as the connecting wires 44 were formed near the center of the chassis 22, it would be difficult to draw the connecting wires 44 through those openings. Therefore, in the present embodiment, the recesses 22A are formed in the light-entering face 20A-side edges of the chassis 22. During the method for manufacturing the backlight device 16, after the components of the backlight device 16 such as the frame 18, the light guide plate 20, the chassis 22, the LED units LU, and the heat sinks 32 are assembled, the LED connectors 40 connected via the connecting wires 44 to the LED driving substrates 42 are inserted from the rear side of the chassis 22 and the heat sinks 32 through the openings 32A1 and the recesses 22A. Next, the LED connectors 40 are connected to the connection sites on the mounting surface 30A of the respective LED substrate 30. During this process, the connecting wires 44 are drawn around the sides of the ribs 12C that extend along the light-entering face 20A-side edges of the reflective sheet 24 in order to keep the connecting wires 44 from interfering with the ribs 12C. Alternatively, the LED connectors 40 may be connected to the LED units LU in advance, and one end of each of the connecting wires 44 that are connected to the LED driving substrates 42 may be inserted from the rear side of the chassis 22 and the heat sinks 32 through the openings 32A1 and the recesses 22A and then connected to the terminals 40A of the LED connectors 40.

In the backlight device 16 of the present embodiment as described above, the light-entering face 20A side of the reflective sheet 24 is supported by the contact with the top of the ribs 12C, and the portions of the reflective sheet 24 that cover the light-entering face 20A side of the opposite surface 20C of the light guide plate 20 are sandwiched between the ribs 12C and the light guide plate 20. This configuration makes it possible to prevent or inhibit separation of the light-entering face 20A side of the reflective sheet 24 from the light guide plate 20 and also makes it possible to prevent or inhibit leakage of light due to separation of those portions from the light guide plate 20. Furthermore, the ribs 12C are formed as integrated parts of the bottom floor 12A of the rear cabinet 12, which is arranged on the side of the chassis 22 opposite to the light guide plate 20 side. This configuration makes it possible to support the light-entering face 20A side of the reflective sheet 24 without adding additional components. In this way, the backlight device 16 of the present embodiment makes it possible, in a configuration in which recesses 22A are formed in the light-entering face 20A side of the chassis 22, to prevent or inhibit leakage of light from the light-entering face 20A sides of the light guide plate 20 without adding additional components.

The present embodiment includes the LED substrates 30 that are arranged near the recesses 22A and on which the plurality of LEDs 28 are mounted, the LED driving substrates 42 that supply power to the LED substrates 30, and the LED connectors 40 and the connecting wires 44 that electrically connect the LED driving substrates 42 to the LED substrates 30. Furthermore, in the method for manufacturing the backlight device 16, the LED connectors 40 and the connecting wires 44 are inserted through the recesses 22A to be electrically connected to the LED substrates 30. In a large backlight device for use in a large television receiver or the like, the recesses must be formed in the light-entering face side of the chassis near the LED substrates in order to make it easier to draw through the connecting members such as the connecting wires that electrically connect the LED driving substrates to the LED substrates. The present embodiment makes it possible, in the backlight device 16 in which the LED connectors 40 and the connecting wires 44 that electrically connect the LED driving substrates 44 to the LED substrates 30 are inserted through the recesses 22A formed in the chassis 22, to prevent or inhibit leakage of light from the light-entering face 20A sides without adding additional components.

Moreover, in the present embodiment, the top of the ribs 12C are flat and oriented parallel to the surface of the light guide plate 20. In this configuration, the light-entering face 20A side of the reflective sheet 24 is supported by the flat top of the ribs 12C, thereby making it possible to increase the surface area of the sections of the top of the ribs 12C that support the reflective sheet 24 in comparison with a configuration in which the top of the ribs 12C are pointed, for example. This, in turn, makes it possible to effectively support the reflective sheet 24 using the ribs 12C.

Furthermore, in the present embodiment the ribs 12C are rectangular cylindrical-shaped and extend along the light-entering face 20A-side edges of the reflective sheet 24. In this configuration, the majority of each of the light-entering face 20A side of the reflective sheet 24 is supported by the ribs 12C, thereby making it possible to satisfactorily support the reflective sheet 24 using the ribs 12C.

Modification Example of Embodiment 1

Figure 6:
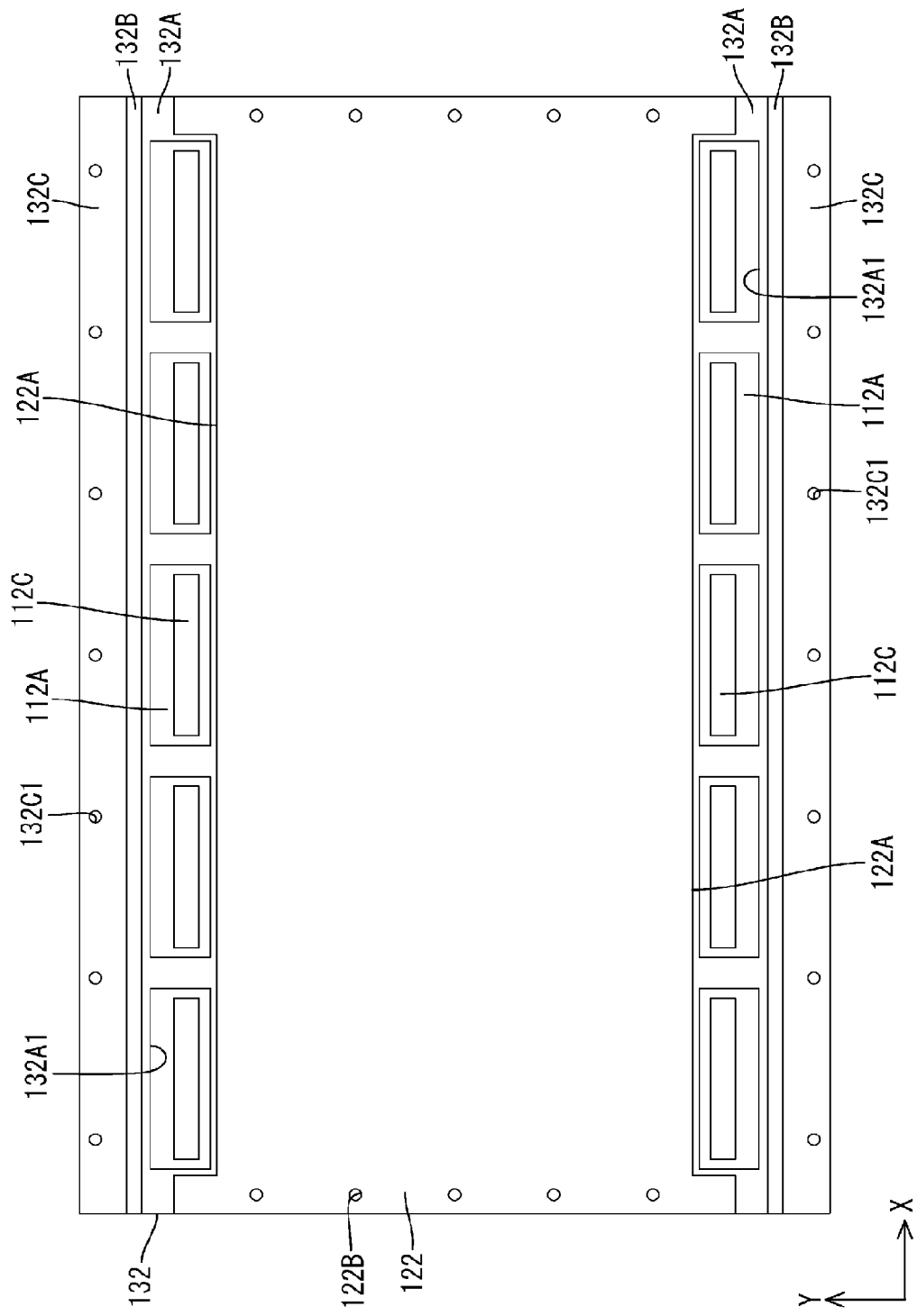
FIG. 6 is a front plan view of a chassis and heat sinks in a modification example of Embodiment 1.

Next, a modification example of Embodiment 1 will be described with reference to FIG. 6. Note that in FIG. 6, each component that has a reference character that is exactly 100 more than the reference character of a component in FIG. 4 is the same as that component from FIG. 4. As illustrated in FIG. 6, a plurality of ribs 112C are formed intermittently along the light-entering face-side edges of the reflective sheet. Moreover, a plurality of openings 132A1 are formed intermittently in bottom portions 132A of heat sinks 132 along the lengthwise direction thereof (that is, along the X direction) at locations corresponding to where the ribs 112C are formed. In this configuration, the light-entering face side of the reflective sheet are supported by the plurality of intermittently formed ribs 112C, thereby making it possible to prevent or inhibit leakage of light on the light-entering face sides of the light guide plate without adding additional components.

Furthermore, in the present modification example, forming the plurality of openings 132A1 intermittently along the lengthwise direction of the heat sinks 132 makes it possible to increase the surface area of the bottom portions 132A of the heat sinks 132 in comparison with a configuration in which continuous openings 132A1 are formed running along the entire lengthwise direction of the heat sinks 132. This makes it possible to increase the heat-dissipating efficiency of the heat sink 132. In addition, during the method for manufacturing the backlight device in the present modification example, the connecting wires can be drawn between the plurality of intermittently formed ribs 112C when connecting the connecting wires and the LED connectors to the LED substrates, thereby making it possible to make the connecting wires much shorter and reduce the cost of the components.

Embodiment 2

Embodiment 2 will be described below with reference to figures. Embodiment 2 is different from Embodiment 1 in that a reinforcing member 234 is arranged between heat sinks 232 and a rear cabinet 212. The other components of the present embodiment are configured the same as in Embodiment 1, and descriptions of the structures, functions, and effects of those components are omitted here. Also, note that in FIGS. 7 and 8, components that have a reference character that is exactly 200 more than the reference character of a component in FIGS. 2 and 5 are the same as the corresponding components from Embodiment 1.

Figure 7:
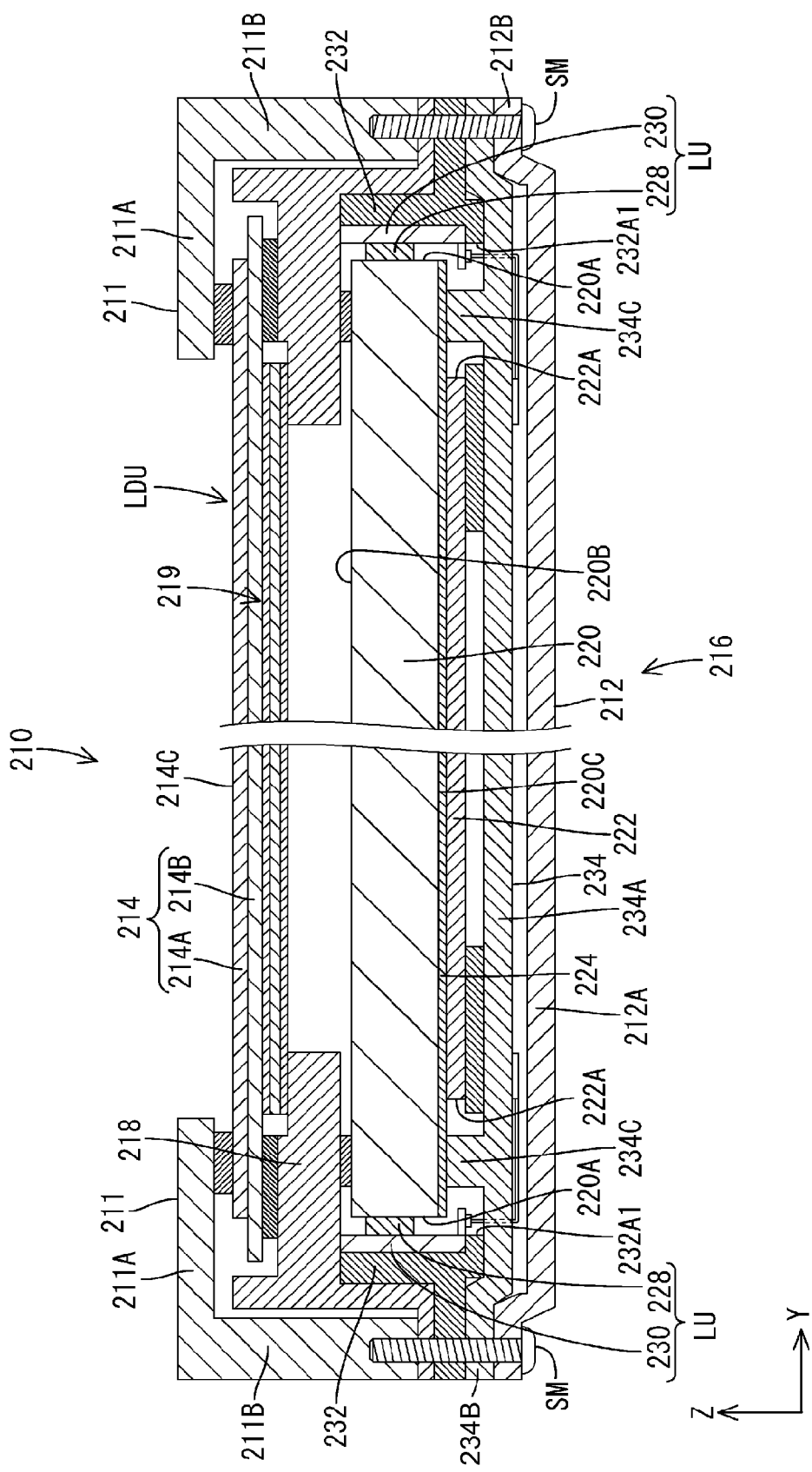
FIG. 7 is a cross-sectional view taken along one of the short sides of a liquid crystal display device according to Embodiment 2.
Figure 8:
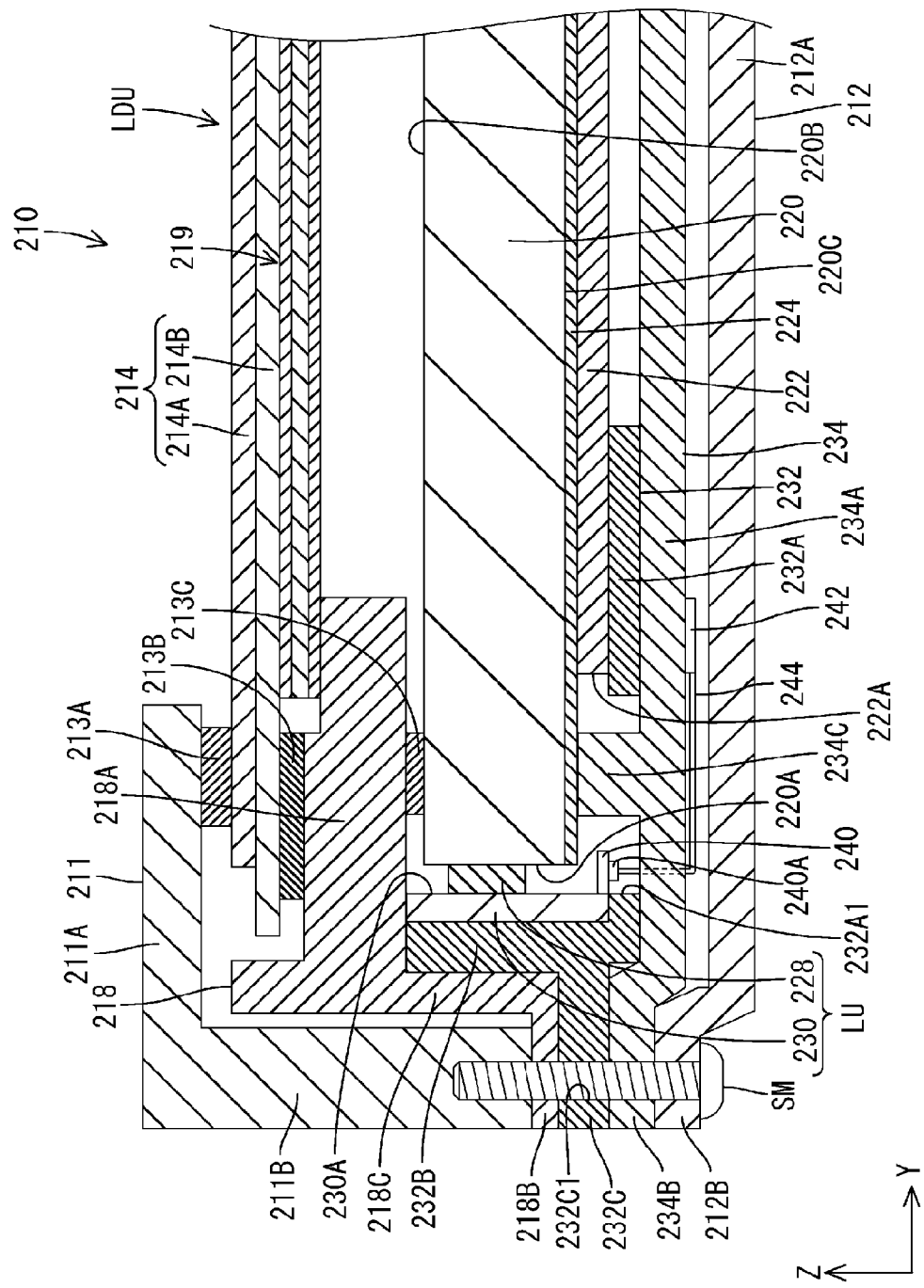
FIG. 8 is an enlarged cross-sectional view taken near a protrusion in FIG. 7.

As illustrated in FIGS. 7 and 8, in a backlight device 216 according to Embodiment 2, the reinforcing member 234 (an example of an opposite-side member) is arranged between the heat sinks 232 and the rear cabinet 212. The reinforcing member 234 is made from a metal that has a high rigidity and is shaped substantially the same as the rear cabinet 12 of Embodiment 1. In other words, the reinforcing member 234 includes: a first reinforcing portion 234A that has substantially the same shape as a bottom floor 212A of the rear cabinet 212 and covers an entire opposite surface 220C of a light guide plate 220; and a second reinforcing portion 234B that has substantially the same shape as an edge 212B of the rear cabinet 212 and that is stepped up relative to the first reinforcing portion 234A and protrudes outwards. Overall, the reinforcing member 234 is a shallow, substantially box-shaped member. The front surface of the first reinforcing portion 234A contacts heat-dissipating portions 232A of the heat sinks 232, thereby supporting those heat-dissipating portions 232A from the rear side. Moreover, LED driving substrates 242 are fixed to the rear surface of the first reinforcing portion 234A. Furthermore, connecting wires 244 extending from the LED driving substrates 242 are drawn across the rear side of the first reinforcing portion 234A and through wire holes (not illustrated in the figures) formed in the first reinforcing portion 234A in order to electrically connect the connecting wires 244 to terminals 240A of LED connectors 240. The second reinforcing portion 234B is sandwiched between protruding portions 232C of the heat sinks 232 and the edge 212B of the rear cabinet 212 and fixed to these components using screws SM.

In the present embodiment, ribs 234C are formed in the first reinforcing portion 234A of the reinforcing member 234 and protrude from the front surface of the first reinforcing portion 234A towards the light guide plate 220. The configuration and arrangement of these ribs 234C is the same as the configuration and arrangement of the ribs in Embodiment 1. In the configuration of the present embodiment as described above, the reinforcing member 234 in which the ribs 234C are formed is covered by the rear cabinet 212 and is therefore protected from external impacts or the like, thereby making it possible to make the ribs 234C less likely to be damaged. Moreover, supporting the heat sinks 232 using the reinforcing member 234 makes it possible to increase not only the strength of the heat sinks 232 but also the strength of the overall backlight device 216.

Embodiment 3

Embodiment 3 will be described below with reference to figures. Embodiment 3 is different from Embodiment 1 in that cushioning members 336 are arranged between a reflective sheet 324 and the top of ribs 312C formed in a rear cabinet 312. The other components of the present embodiment are configured the same as in Embodiment 1, and descriptions of the structures, functions, and effects of those components are omitted here. Note that in FIG. 9, the components that have a reference character that is exactly 300 more than the reference character of a component in FIG. 2 correspond to the same components used in Embodiment 1.

Figure 9:
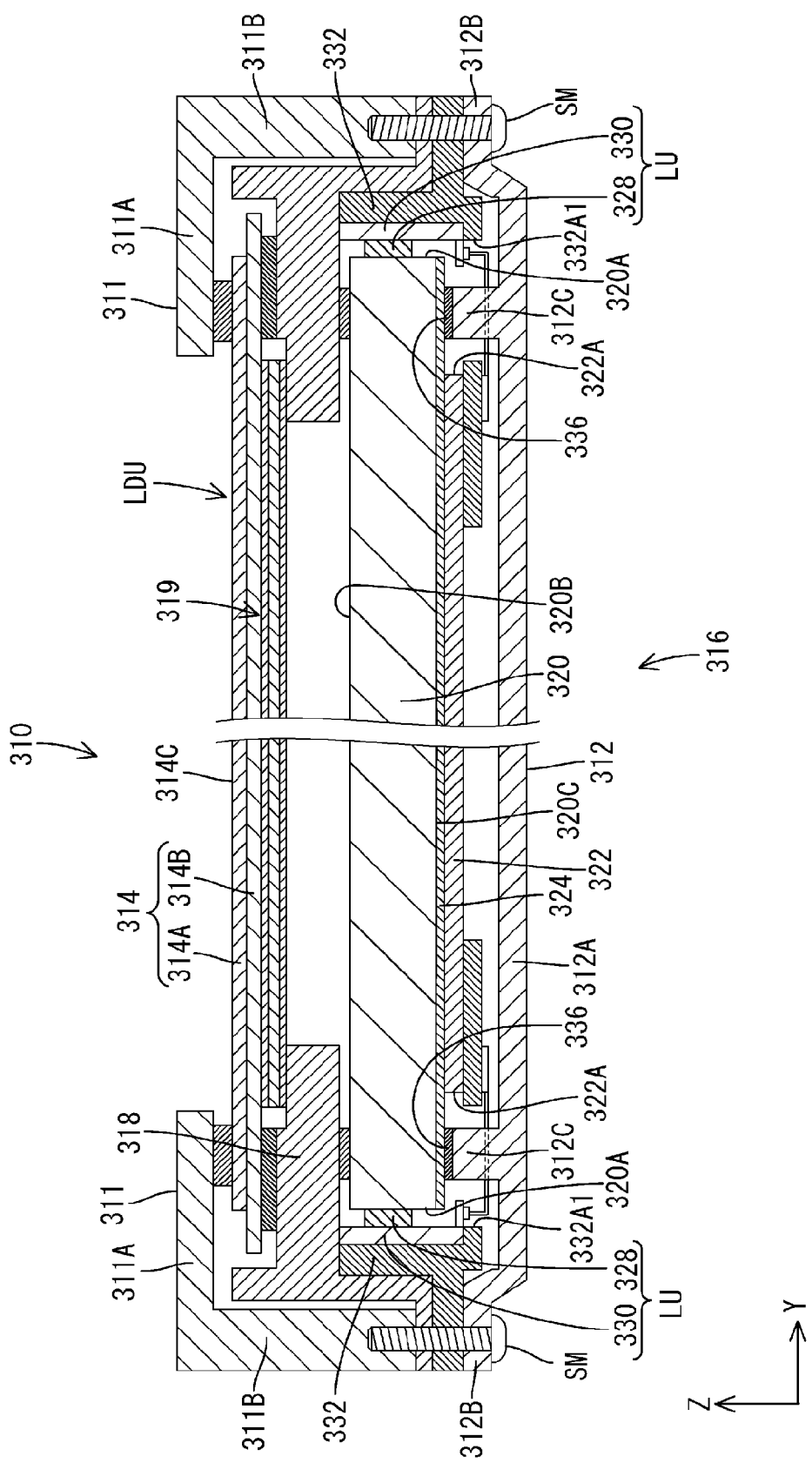
FIG. 9 is a cross-sectional view taken along one of the short sides of a liquid crystal display device according to Embodiment 3.

As illustrated in FIG. 9, in a backlight device 316 according to Embodiment 3, the cushioning members 336 are arranged between the reflective sheet 324 and the top of the ribs 312C formed in the rear cabinet 312. The cushioning members 336 have substantially the same thickness as the reflective sheet 324 and are arranged covering substantially the entire flat top of the ribs 312C. In the present embodiment, arranging the cushioning members 336 as described above makes it possible to reduce transmission of heat from the ribs 312C to the reflective sheet 324. Furthermore, the cushioning members 336 make it possible to prevent or inhibit the occurrence of squeaking noises or the like between the ribs 312C and the reflective sheet 324.

Embodiment 4

Embodiment 4 will be described below with reference to figures. Embodiment 4 is different from Embodiment 1 in that a plurality of ribs 412C are formed in a rear cabinet 412 and arranged in a direction orthogonal to light-entering faces 420A of a light guide plate 420. The other components of the present embodiment are configured the same as in Embodiment 1, and descriptions of the structures, functions, and effects of those components are omitted here. Note that in FIG. 10, the components that have a reference character that is exactly 400 more than the reference character of a component in FIG. 2 correspond to the same components used in Embodiment 1.

Figure 10:
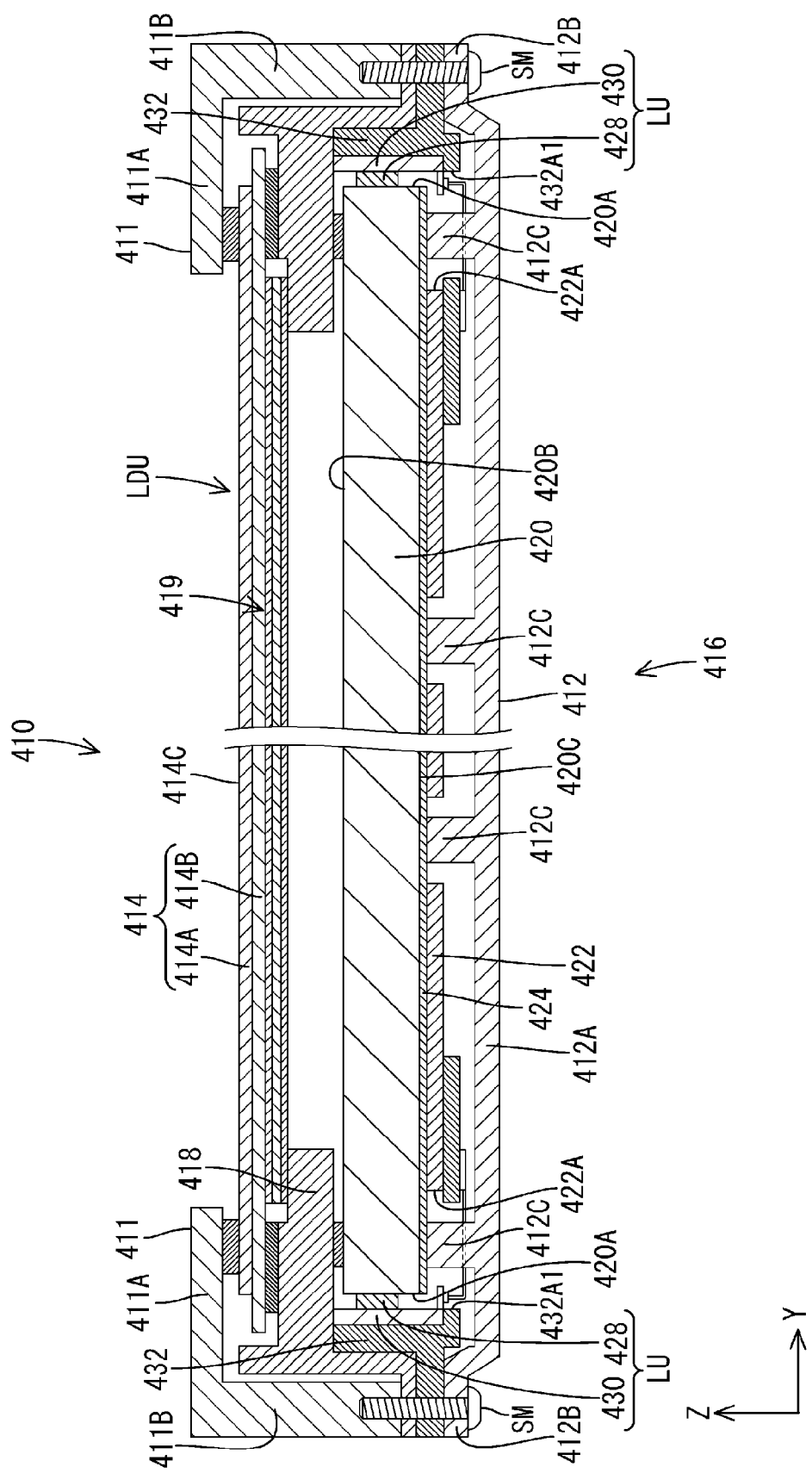
FIG. 10 is a cross-sectional view taken along one of the short sides of a liquid crystal display device according to Embodiment 4.

As illustrated in FIG. 10, in a backlight device 416 according to Embodiment 4, the plurality of ribs 412C are formed in a bottom floor 412A of the rear cabinet 412 and are arranged in a direction orthogonal to the light-entering faces 420A of the light guide plate 420 (that is, in the Y direction). The configuration and shape of each of the ribs 412C is the same as the configuration and shape of the ribs in Embodiment 1. Moreover, in the portions of a chassis 422 that overlap, when viewed in a plan view, with the ribs 412C positioned further interior than the ribs 412C formed on the light-entering face 420A sides, chassis openings 422C that can accommodate those interior ribs 412C are formed. In the configuration of the present embodiment as described above, a reflective sheet 424 is supported along a direction orthogonal to the light-entering faces 420A by the plurality of ribs 412C, thereby making it possible to satisfactorily support the reflective sheet 424 using the ribs 412C.

Embodiment 5

Embodiment 5 will be described below with reference to figures. In Embodiment 5, the shape and arrangement of ribs 512C is different from the shape and arrangement of the ribs in Embodiment 1. The other components of the present embodiment are configured the same as in Embodiment 1, and descriptions of the structures, functions, and effects of those components are omitted here. Note that in FIG. 11, the components that have a reference character that is exactly 500 more than the reference character of a component in FIG. 4 correspond to the same components used in Embodiment 1.

Figure 11:
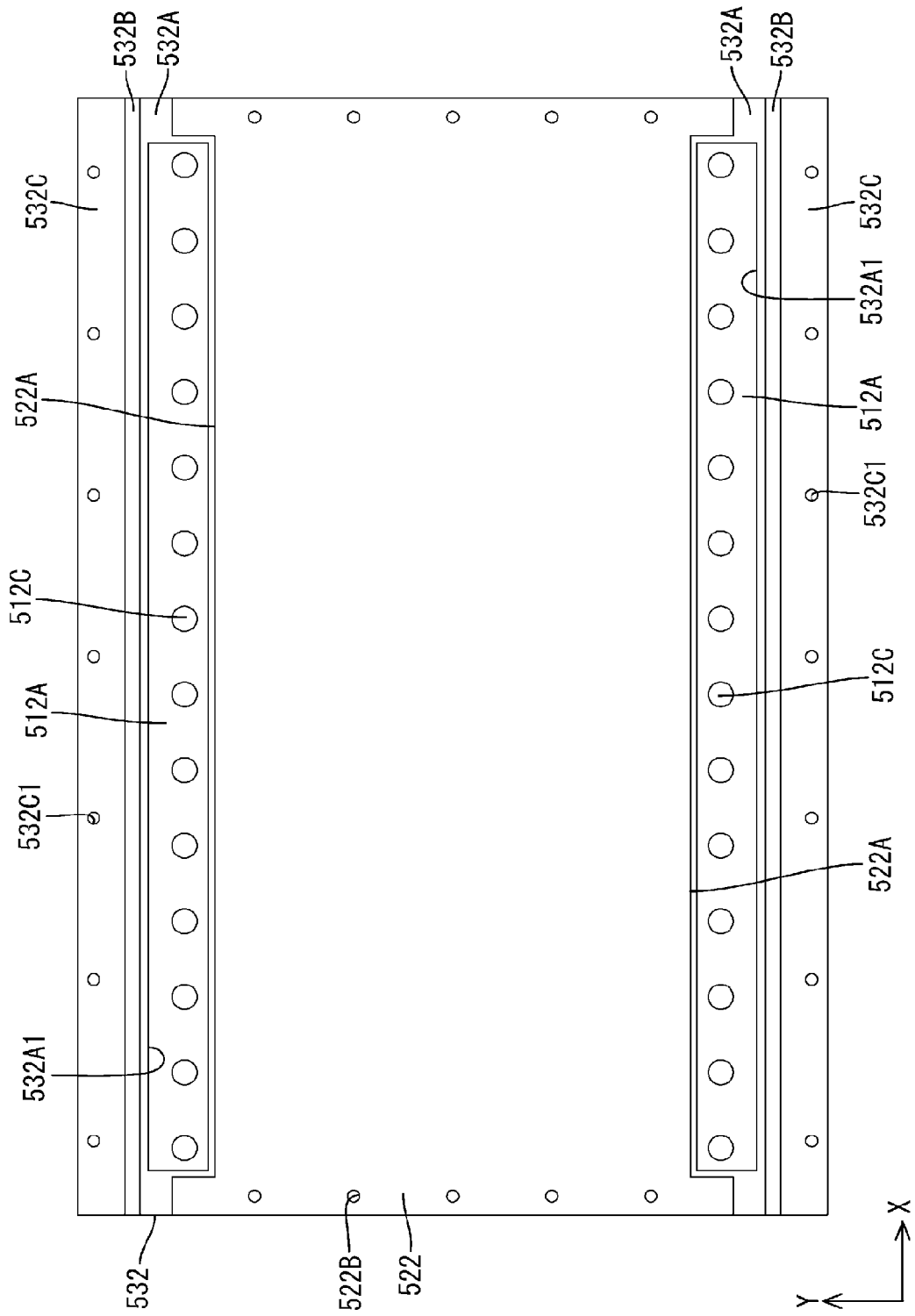
FIG. 11 is a front plan view of a chassis and heat sinks in Embodiment 5.

As illustrated in FIG. 11, in a backlight device according to Embodiment 5, a plurality of ribs 512C are formed intermittently along the light-entering face-side edges of a reflective sheet. Moreover, each rib 512C is a cylinder with a flat top. In the configuration of the present embodiment as described above, the light-entering face side of a reflective sheet are supported by the plurality of intermittently formed and cylindrical ribs 512C, thereby making it possible to prevent or inhibit leakage of light on the light-entering face sides of a light guide plate without adding additional components.

Next, modification examples of the embodiments will be described.

(1) In each of the embodiments described above, the ribs are formed in the rear cabinet or in the reinforcing member. However, the component in which the ribs are formed is not limited, and the ribs may be formed in any component that is arranged on the side of the chassis opposite to the light guide plate side.

(2) In each of the embodiments described above, the top of the ribs are flat. However, the shape of the top of the ribs is not limited to this. Any shape may be used for the top of the ribs as long as the light-entering face side of the reflective sheet is still supported.

(3) In each of the embodiments described above, the ribs are formed as integrated parts of the rear cabinet or the reinforcing member. However, the ribs may also be formed as individual components separate from the rear cabinet or the reinforcing member or the like.

(4) In each of the embodiments described above, the recesses formed in the chassis were recess-shaped. However, characteristics such as the shape and configuration of the recesses formed in the chassis are not limited to this.

(5) In each of the embodiments described above, the LED substrates and the LED driving substrates are electrically connected together via the LED connectors and the connecting wires. However, the configuration of the connecting members for electrically connecting the LED substrates to the LED driving substrates is not limited to this.

(6) In each of the embodiments described above, the backlight device includes heat sinks. However, the backlight device may also be configured not to include heat sinks.

(7) Characteristics of the ribs such as the configuration, shape, arrangement, and number thereof may be modified as appropriate to achieve configurations other than those used in the embodiments described above.

(8) In each of the embodiments described above, the light-entering faces are provided along both end faces of the long sides of the light guide plate. However, the portions of the end faces of the light guide plate that are chosen to function as the light-entering faces are not limited to this.

(9) Each of the embodiments described above includes a large liquid crystal display device and a large backlight device. However, the sizes of the liquid crystal display device and the backlight device are not limited to this.

(10) Each of the embodiments described above includes cabinets as exterior members. However, the present invention may also be configured not to include cabinets.

(11) Each of the embodiments described above includes a liquid crystal display device in which a liquid crystal panel is used for the display panel. However, the present invention may also be applied to display devices in which other types of display panels are used.

(12) In each of the embodiments described above, the television receiver includes a tuner. However, the present invention may also be applied to display devices that do not include a tuner.

Embodiments of the present invention were described in detail above, but these embodiments are only examples and do not limit the scope of the claims in any way. The technology disclosed in the claims also includes various changes and modifications to the specific examples described above.

DESCRIPTION OF REFERENCE CHARACTERS

TV television receiver
LDU liquid crystal display unit
P power supply
T tuner
S stand
LU LED unit
SM screw
10, 210, 310, 410 liquid crystal display device
11, 211, 311, 411 front cabinet
12, 212, 312, 412 rear cabinet
12C, 112C, 234C, 312C, 412C, 512C rib
16, 216, 316, 416 backlight device
20, 220, 320, 420 light guide plate
24, 224, 324, 424 reflective sheet
22, 122, 222, 322, 422, 522 chassis
28, 228, 328, 428 LED
30, 230, 330, 430 LED substrate
32, 132, 232, 332, 432, 532 heat sink
234 reinforcing member
336 cushioning member

What is claimed is:

1. An illumination device, comprising:
a light source;
a light guide plate in which at least one end face is a light-entering face into which light from the light source enters and one surface is a light-exiting surface;
a reflective sheet arranged covering at least a portion on a light-entering face side of a bottom surface of the light guide plate opposite to the light-exiting surface;
a chassis that is arranged on a side of the reflective sheet opposite to the light guide plate and that includes at least a plate-shaped portion arranged along the bottom surface of the light guide plate, a cut-out being provided in the plate-shaped portion on the light-entering face side; and
an opposite-side member that is arranged on a side of the chassis opposite to the light guide plate and that includes a protrusion protruding from a light guide plate-side of a top surface of the opposite-side member through the cut-out towards the light guide plate, a top of the protrusion supporting a portion of the reflective sheet on the light-entering face side.

2. The illumination device according to claim 1, further comprising:
a light source substrate on which the light source is mounted in a plurality and that is arranged adjacent to the cut-out in the plate-shaped portion of the chassis;
a light source driving substrate that supplies power to the light source substrate; and
a connecting member that electrically connects the light source substrate to the light source driving substrate,
wherein the connecting member is drawn through the cut-out to connect to the light source substrate.

3. The illumination device according to claim 1, wherein the top of the protrusion is flat and disposed along the bottom surface of the light guide plate.

4. The illumination device according to claim 3, wherein the protrusion is a column formed along an edge of the reflective sheet on the light-entering face side.

5. The illumination device according to claim 4, wherein the protrusion is provided in a plurality along a direction orthogonal to the light-entering face of the light guide plate.

6. The illumination device according to claim 1, further comprising:
a cushioning member between the top of the protrusion and the reflective sheet.

7. The illumination device according to claim 1, further comprising:
an exterior member that forms an exterior of the illumination device and that is arranged on a side of the opposite-side member opposite to the chassis.

8. The illumination device according to claim 1, wherein the opposite-side member forms an exterior of the illumination device.

9. A display device, comprising:
the illumination device according to claim 1; and
a display panel for displaying images using light from the illumination device.

10. The display device according to claim 9, wherein the display panel is a liquid crystal panel that uses liquid crystal.

11. A television receiver, comprising:
the display device according to claim 9.

* * * * *